United States Patent
Hara

[15] 3,651,545
[45] Mar. 28, 1972

[54] BINDING DEVICE FOR FASTENING TWO PLATES

[72] Inventor: Kunio Hara, Sagamihara, Japan
[73] Assignee: Nifco, Inc., Tokyo, Japan
[22] Filed: Sept. 25, 1970
[21] Appl. No.: 75,586

[30] Foreign Application Priority Data

Sept. 27, 1969 Japan....................................44/91683

[52] U.S. Cl. ................................................24/73 P, 85/5 R
[51] Int. Cl. ......................................................A44b 21/00
[58] Field of Search ...................24/73 PF, 73 D, 73 P, 73 R, 24/213 CS, 213 R, 214; 85/5, 5 R

[56] References Cited

UNITED STATES PATENTS

| | | | |
|---|---|---|---|
| 2,745,133 | 5/1956 | McWethy | 24/213 R X |
| 2,983,008 | 5/1961 | Von Rath | 24/213 R X |
| 3,037,596 | 6/1962 | Fordyce | 85/5 R X |
| 3,093,027 | 6/1963 | Rapata | 85/5 R |
| 3,093,874 | 6/1963 | Rapata | 24/73 PM |
| 3,380,581 | 4/1968 | Landgraf | 24/73 PF X |
| 3,393,431 | 7/1968 | Saunders | 24/73 PF |
| 3,550,217 | 12/1970 | Collyer | 24/73 PF |

FOREIGN PATENTS OR APPLICATIONS 1,134,247  11/1968  Great Britain ..........................85/5 R

*Primary Examiner*—Donald A. Griffin
*Attorney*—Robert W. Beart, Michael Kovac and Jack R. Halvorsen

[57] ABSTRACT

A binding device made of synthetic resin for fastening two plates at a given fixed distance, which device comprises a flange, a pin member erected on one side of the flange and a check member erected on the other side thereof.

6 Claims, 5 Drawing Figures

Patented March 28, 1972 3,651,545
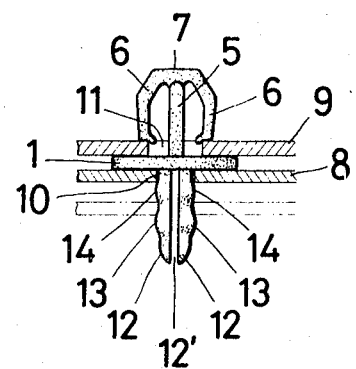
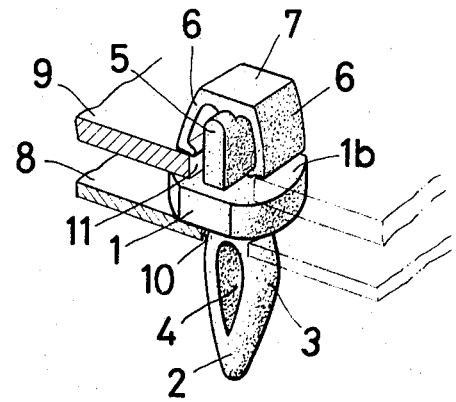
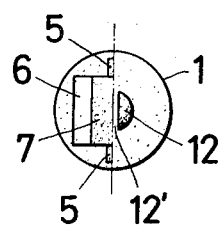
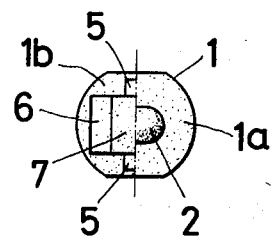
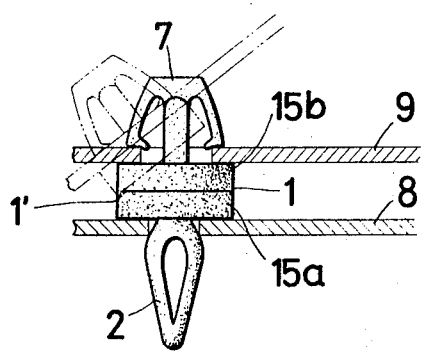
INVENTOR
Kunio Hara
BY
ATTORNEYS

BINDING DEVICE FOR FASTENING TWO PLATES

BACKGROUND OF THE DISCLOSURE

This invention relates to a binding device for fastening two plates at a fixed distance from each other.

In electric and telecommunication equipment, it is frequently found necessary to fix two printed-circuit boards at a fixed distance from each other in electrically insulated relation or to fix one such board so as to be electrically insulated at a given distance from the chassis. In such cases, it has heretofore been the practice to use screws, insulating washers, collars and similar means which inevitably involved troublesome operations. This resulted in the extremely low efficiency of assembly operations.

An object of this invention is to provide a binding device which, being formed of resilient, non-conducting synthetic resin such as nylon or polypropylene, can be used to fasten two plates at a fixed distance by simply compressing and pressing the resilient material of the binding device through holes bored in the said two plates.

Another object of the present invention is to provide a binding device which is easy to manufacture and which combines a fastening member and a space-retaining member as one integrated element.

Other objects and characteristics of the present invention will become apparent from reading the following full description which is given with reference to the accompanying drawing.

BRIEF DESCRIPTION OF THE DRAWING

FIG. 1 is a perspective view of one embodiment of the binding device of this invention.

FIG. 2 is a plan view of the same embodiment, with one-half of the plan view representing what is observed from above and the other half thereof, what is observed from below.

FIG. 3 is a side view of another embodiment of the binding device.

FIG. 4 is a plan view of the same embodiment, with one-half of the plan view representing what is observed from above and the other half thereof what is observed from below.

FIG. 5 is a side view of a modification of the embodiment illustrated in FIG. 1.

DETAILED DESCRIPTION OF THE INVENTION

Referring to FIGS. 1 and 2, tapered pin member 2 is erected from the center of surface 1a of flange 1. Said pin 2 includes a short section in which the diameter thereof gradually increases with the increase in the distance from the flange 1. At the portion at which said section terminates and the pin reaches the largest diameter (portion 3 in the figure), there is provided groove or aperture 4 which permits portion 3 to be deformed so as to decrease the diameter thereof. On the other surface 1b of flange 1, there is provided check member 7 of the shape of an inverted anchor or an arrow. This check member comprises main stem 5 erected at the center of flange 1 and branches 6 extending outward and downward from the top end of main stem 5.

Flange 1, pin member 2 and check member 7 mentioned above are formed inseparably of resilient synthetic resin.

Through one plate 8 of the two plates desired to be fastened is bored a hole 10 of such size that the largest portion 3 of pin member 2 can be passed through solely by virtue of the deformability of the portion 3, and through the other plate 9 is bored another hole 11 of such size that check member 7 can be passed through solely by virtue of the fact that branches 6 can be bent so far as to touch the main stem 5. Pin 2 can then be forced through hole 10 and check member 7 through hole 11 so as to fix the two plates 8 and 9 with flange 1 serving as a spacer. When the largest portion 3 of pin member 2 has passed through hole 10 and the hole comes to rest in section, the largest portion 3 expands to its original cross section and consequently pushes plate 8 elastically against the surface 1a of flange 1. When branches 6 and 6 have slid past hole 11, they press plate 9 against the surface 1b of flange 1. Thus, plates 8 and 9 are securely fastened together. Once the plates are fastened in this state, neither can be easily detached. Of course, plate 8 can be pulled off pin 2 when said plate is pulled in the direction of the forward end of pin member 2 with force sufficient to deform pin member 2 and make the hole 10 slide over the largest portion 3. Similarly, plate 9 can be pulled off the present binding device by squeezing branches 6 with the finger tips until they come into contact with main stem 5 and then passing check member 7 through hole 11 in the reverse direction. It is easier to remove plate 8 from pin 2 than to remove plate 9 from check member 7 inasmuch as plate 8 can be removed from pin 2 simply by pulling. In the example illustrated in FIG. 3 and FIG. 4 the pin member 2 is split along its entire length to form two legs 12. The cross section of each leg may, for example, be of a substantially semicircular shape. The two legs 12 each have modularly expanded portions 13 and 14 at two levels. Therefore, hole 10 of a diameter through which expanded portions 13 and 14 cannot pass in the non-compressed state is bored in plate 8, so that in passing legs 12 through hole 10, the expanded portions 13 and 14 are compressed to a reduced cross section achieved by taking advantage of the cleft 12' to bring legs 12 closer to each other. The expanded portions can thus be forced through hole 10. Upon passing through the hole, the legs go back to their original form and consequently fix the plate 8. Since cleft 12' is formed inwardly from the forward end of pin member 2, the resilience at different points of legs 12 increases with the increase in the distance from flange 1. Therefore, the plate 8 may first be attached temporarily by expanded portion 13 which is at a greater distance from the flange 1. If, at this time, plate 8 is found to be functioning improperly, it can be pulled off and fastened securely on the expanded portion 14 closer to the flange 1 after the trouble has been corrected.

The check member which is erected on the other surface 1b of flange 1 has the same construction as that of the example illustrated in FIG. 1. Thus, it is easier to pull plate 8 off legs 12 than to pull plate 9 over check member 7.

In the example illustrated in FIG. 5 the flange of FIG. 1 and FIG. 2 is formed of two parts 15a and 15b which are hingedly joined at the edge portion 1'. Pin 2 is erected on the part 15a of flange 1, while check member 7 is formed on the other part 15b of flange 1.

By forming flange 1 with two hinged parts 15a and 15b and then fixing the plates 8 and 9 on their respective outer sides, plate 8 and plate 9 can be opened about edge portion 1' of flange 1 when they are fixed on part 15a and part 15b. This device proves to be convenient for the purpose of permitting the inspection of the confronting surfaces of plates 8 and 9 or attaching necessary parts to the said confronting surfaces.

Flange 1 can be prevented from being opened by suitably fastening the free edges of the plates 8 and 9 to each other by the use of some other binding means.

In short, the present invention consists in forming pin member 2 and check member 7 of resilient, non-conducting synthetic resin as inseparable elements with the pin member and the check member serving to fix plates 8 and 9 onto opposite sides of flange 1. This device makes it extremely simple to fix the two plates 8 and 9 via the flange 1 in such way as to ensure their electrical insulation and spacing. Moreover, since the plate fixed on the pin member can be removed by merely exerting a sufficient extracting force, the present device proves to be highly convenient where parts of limited service life are attached to the plate 8 so that the operation of the entire electric or telecommunication equipment need be interrupted only briefly while plate 8 is replaced in its entirely upon termination of the service life of the said parts.

I claim:

1. A one-piece plastic fastener for fastening two apertured plates at a fixed distance from each other, said fastener including a split platelike head having two portions normally positioned in juxtaposed relation, integral hinge means joining said two portions to permit angular disposition of one portion relative to the other portion, resilient fastening means extending outwardly in generally opposite directions from said platelike head, when in its juxtaposed position, one of said fastening means being positively retained relative to the apertured plate with which it is associated and the other fastening means being impositively retained in the other apertured plate.

2. A fastener of the type claimed in claim 1 wherein said positively retained fastening means includes abrupt shoulder means adapted to be resiliently moved radially inwardly during insertion through one of said apertured panels and to rigidly engage the opposite surface of said panel from the surface engaged by said head and adapted to not be unseated by an axial force applied to said fastener.

3. A fastener as set forth in claim 2, wherein the fastening means is a pin provides with an expanded portion capable of being deformed elastically to a reduced diameter.

4. A fastener of the type claimed in claim 2 wherein said impositively retained fastening means includes resilient cam surfaces for engaging said apertured panel and said fastening means capable of removal by application of a predetermined axial force to said fastener.

5. A fastener as set forth in claim 4, wherein the impositive fastening means is a pin provided with an expanded portion capable of being deformed elastically to a reduced diameter.

6. A fastener as set forth in claim 4, wherein the impositive fastening means is provided with a plurality of expanded portions and divided into two legs by a cleft running longitudinally thereof.

* * * * *